United States Patent [19]

Kaneko

[11] Patent Number: 5,445,087

[45] Date of Patent: Aug. 29, 1995

[54] APPARATUS FOR INCINERATING WASTE MATERIAL

[76] Inventor: Masamoto Kaneko, 778-2 Yanakamachi, Takasaki-shi, Gunma-ken, Japan

[21] Appl. No.: 296,160

[22] Filed: Aug. 15, 1994

Related U.S. Application Data

[63] Continuation of Ser. No. 46,567, Apr. 16, 1993, abandoned.

[30] Foreign Application Priority Data

Apr. 17, 1992 [JP] Japan .................................. 4-098108

[51] Int. Cl.⁶ .............................................. F23G 5/00
[52] U.S. Cl. .................... 110/235; 110/229; 110/244; 110/190
[58] Field of Search ............... 110/229, 244, 235, 190

[56] References Cited

U.S. PATENT DOCUMENTS

| | | | |
|---|---|---|---|
| 3,771,469 | 11/1973 | Ali et al. | 110/244 |
| 3,797,413 | 3/1974 | Ali et al. | 110/244 |
| 3,817,192 | 6/1974 | Watterback | 110/244 |
| 3,848,550 | 11/1974 | Bowen | 110/244 |
| 3,855,951 | 12/1974 | Giles | 110/244 |
| 4,063,521 | 12/1977 | Pech | 110/8 A |
| 4,159,000 | 6/1979 | Iwesaki et al. | 110/244 |
| 4,323,018 | 4/1982 | Iwesaki et al. | 110/244 |
| 5,101,739 | 4/1982 | Nance et al. | 110/229 |
| 5,213,051 | 5/1993 | Kaneko | 110/229 |

FOREIGN PATENT DOCUMENTS

| | | |
|---|---|---|
| 2001419A | 7/1977 | European Pat. Off. . |
| 2-135280 | 5/1990 | Japan . |
| 20135280 | 5/1990 | Japan . |

*Primary Examiner*—Henry A. Bennet
*Assistant Examiner*—Siddmarth Ohri
*Attorney, Agent, or Firm*—Paul A. Guss

[57] ABSTRACT

An apparatus for incinerating a waste material by processing the waste material through dry distillation and gasification has a gasification furnace for storing a waste material therein and burning a portion of the waste material and thermally decomposing the remainder of the waste material by way of dry distillation with the heat of combustion of the portion of the waste material, thereby producing a combustible gas, and a combustion furnace connected to the gasification furnace through a gas introduction passage for mixing, with oxygen, the combustible gas introduced therein from the gasification furnace through the gas introduction passage and combusting the combustible gas mixed with the oxygen, the combustion furnace having a gas inlet port connected to the gas introduction passage. An oxygen supply device supplies the combustion furnace with an amount of oxygen required to combust the combustible gas into the combustion furnace while generating a swirling oxygen flow around the gas inlet port.

6 Claims, 3 Drawing Sheets

APPARATUS FOR INCINERATING WASTE MATERIAL

This is a continuation of application Ser. No. 08/046,567, filed Apr. 16, 1993, status abandoned.

BACKGROUND OF THE INVENTION

1. Field of the Invention

The present invention relates to an apparatus for incinerating waste materials such as waste tires, for example.

2. Description of the Prior Art

One known apparatus for incinerating waste materials such as waste tires is disclosed in Japanese Laid-Open Patent Publication No. 2-135280. Specifically, the disclosed incinerating apparatus comprises an apparatus for incinerating a waste material by processing the waste material through dry distillation and gasification.

The disclosed incinerating apparatus has a gasification furnace in which a waste material is placed. In the gasification furnace, a portion of the waste material is burned while the remainder of the waste material is subjected to dry distillation (i.e., thermally decomposed) with the heat of combustion, until finally the waste material is fully burned and ashed. A combustible gas produced when the waste material is thermally decomposed is introduced from a gasification furnace through a gas passage into a combustion furnace. In the combustion furnace, the supplied combustible gas is mixed with oxygen (air) and burned.

In order to maintain the temperature of the combustible gas as it is burned in the combustion furnace at a substantially constant level for sufficiently reducing any nitrogen oxides, the combustion furnace is supplied with an amount of oxygen that is required to combust a portion of the waste material, depending on the temperature of combustion, for thereby controlling the partial combustion of the waste material to keep substantially constant the amount of combustible gas generated in the gasification furnace and also the amount of the combustible gas introduced into the combustion furnace.

More specifically, heretofore, the combustible gas and oxygen are mixed and the mixture is combusted in the combustion furnace as follows:

The combustion furnace comprises a burner connected to the gas passage and a combustion chamber coupled to the burner. The burner and the combustion chamber have their inner walls made of a refractory material. The combustion furnace is surrounded by an air chamber connected to an oxygen supply, i.e., an air supply, and communicating with the combustion furnace through a plurality of air inlet holes defined in the inner wall of the combustion furnace. The burner is equipped with an igniter, and air is drawn from the combustion chamber by a suction fan or the like to introduce the combustion gas from the gasification furnace.

When the waste material starts being thermally decomposed in the gasification furnace, a combustible gas generated by dry distillation is introduced through the gas passage into the burner of the combustion chamber. At the same time, oxygen (air) is also introduced from the oxygen supply through the air chamber and the air inlet holes into the burner, where the oxygen is mixed with the combustion gas. The mixture is ignited by the igniter, and the combustible gas is combusted. As the dry distillation of the waste material progresses stably in the gasification furnace, the temperature of the combustible gas as it is burned in the combustion furnace is kept at a substantially constant level. The combustible gas is now combusted of its own, and the igniter is inactivated.

Since the oxygen is supplied from the air chamber through the air inlet holes into the combustion chamber to combust the combustible gas in the combustion chamber, the conventional incinerating apparatus has suffered the following drawbacks:

Inasmuch as the amount of oxygen needed to combust the combustible gas is supplied through the air inlet holes into the burner, it takes a certain period of time for the combustible gas and the oxygen to be uniformly mixed with each other. For complete combustion of the combustible gas introduced into the combustion furnace, therefore, the combustion furnace requires a retentive region for uniformizing the mixture of the combustible gas and the oxygen, and is hence relatively large in size. If the amount of combustible gas to be introduced into the combustion chamber is increased for higher combustion capability, then the period of time required for the combustible gas and the oxygen to be uniformly mixed with each other is also increased, and hence the retentive region is also increased in size, resulting in an increase in the size of the combustion chamber.

With a combustion chamber having increased size as described above for greater combustion capability, it is difficult to keep the region for uniformly mixing the combustion gas and the oxygen at a constant position in the combustion chamber. Therefore, the position where the combustion gas is burned in the combustion chamber tends to fluctuate. As the position where the combustion gas is burned fluctuates, a positive pressure may be applied to an inlet port through which the combustible gas is introduced into the combustion chamber, possibly causing the combustible gas introduced into the combustion chamber to become unstable in amount. As a consequence, it is difficult to burn the combustible gas stably at a predetermined temperature.

As the size and hence volume of the combustion chamber increase, the capacity of the suction fan for drawing air from the combustion chamber has to be increased. Furthermore, the capacity of the suction fan must be large enough to prevent a positive pressure from being imposed on the inlet port for introducing the combustible gas into the combustion chamber. Accordingly, the load exerted by the suction fan is considerably large.

Therefore, the combustion chamber of conventional incinerating apparatus is large in size, and its combustion capability cannot be greatly increased.

SUMMARY OF THE INVENTION

It is therefore an object of the present invention to provide an apparatus for incinerating a waste material by processing the waste material through dry distillation and gasification, the apparatus having a relatively small combustion chamber for higher combustion capability, and being capable of smoothly introducing a combustible gas into the combustion chamber for smooth combustion of the combustible gas.

According to the present invention, there is provided an apparatus for incinerating a waste material by processing the waste material through dry distillation and gasification, comprising a gasification furnace for storing a waste material therein and burning a portion of the waste material and thermally decomposing the remainder of the waste material by way of dry distillation with the heat of combustion of the portion of the waste material, thereby producing a combustible gas, a combustion furnace connected to the gasification furnace through a gas introduction passage for mixing, with oxygen, the combustible gas introduced therein from the gasification furnace through the gas introduction passage and combusting the combustible gas mixed with the oxygen, the combustion furnace having a gas inlet port connected to the gas introduction passage, and oxygen supply means for supplying the combustion furnace with an amount of oxygen required to combust the combustible gas into the combustion furnace while generating a swirling oxygen flow around the gas inlet port.

The oxygen supplied from the oxygen supply means into the combustion furnace is swirled around the gas inlet port to draw the combustible gas from the gasification furnace through the gas introduction passage into the combustion furnace and mix the introduced combustible gas quickly with the oxygen.

The combustion furnace may comprise a substantially cylindrical combustion furnace with the gas inlet port being defined substantially centrally in one end thereof, the combustion furnace having an oxygen inlet port defined radially outwardly of the gas inlet port tangentially with respect to the combustion furnace and opening into the combustion furnace, the oxygen supply means comprising means for supplying the amount of oxygen through the oxygen inlet port into the combustion furnace to generate the swirling oxygen flow around the gas inlet port.

The combustion furnace may have a gas ejection port defined in an opposite end thereof for ejecting a gas produced when the combustible gas is combusted in the combustion furnace, the combustion furnace having a tapered section joined to and tapered toward the gas ejection port. In the tapered section, the swirling oxygen flow impinges upon an inner wall surface thereof, producing a turbulent flow which is effective to promote the mixing of the combustible gas and the oxygen.

The apparatus may also have igniting means positioned near the gas inlet port for igniting the combustible gas that is introduced from the gas inlet port into the combustion furnace for quick combustion of the combustible gas introduced in the combustion furnace.

The igniting means may generate an igniting flame along a swirling flow produced around the gas inlet port. Thus, the igniting flame is stabilized for smooth ignition of the mixture of the combustible gas and the oxygen.

The igniting means may generate an igniting flame toward the oxygen inlet port for quickly heating the oxygen supplied to the combustion furnace to quick combustion of the mixture of the combustible gas and the oxygen.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

An apparatus for incinerating waste materials such as waste tires according to the present invention will be described with reference to FIGS. 1 through 3(a), 3(b), 3(c).

Figure 1:
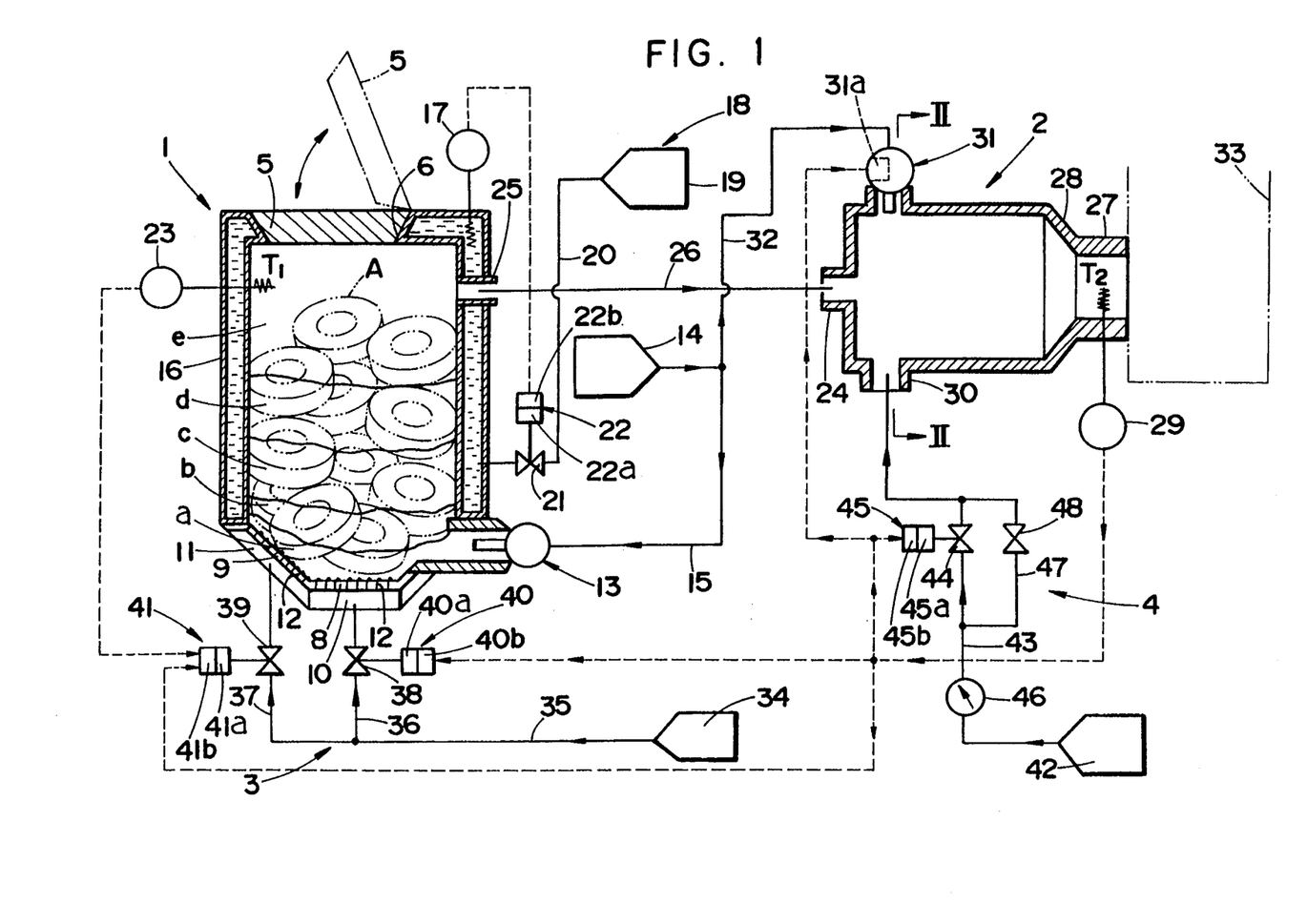
FIG. 1 is a schematic diagram of an apparatus for incinerating a waste material according to the present invention.

FIG. 1 schematically shows an arrangement of the apparatus, and FIGS. 2(a), 2(b) and 3(a), 3(b), 3(c) show an operation sequence of the apparatus shown in FIG. 1.

As shown in FIG. 1, the apparatus includes a gasification furnace 1 for thermally decomposing by way of dry distillation, gasifying, burning, and ashing a waste material A such as waste tires placed in the gasification furnace 1, a combustion furnace 2 for combusting a combustible gas produced when the waste material A is thermally decomposed by dry distillation in the gasification furnace 1, an oxygen supply device 3 for supplying oxygen (air) to the gasification furnace 1, and an oxygen supply device 4 for supplying oxygen (air) to the combustion furnace 2.

The gasification furnace 1 has a charge inlet 6 defined in an upper wall thereof and openable and closable by a hinged door 5. The waste material A can be charged into the gasification furnace 1 through the charge inlet 6 as it is opened by the door 5. When the charge inlet 6 is closed by the door 5, the interior space of the gasification furnace 1 is virtually isolated from the ambient space.

The gasification furnace 1 has a downwardly projecting frustoconical lower wall composed of a bottom wall section 8 and a slanted side wall section 9. The bottom and side wall sections 8, 9 have respective empty chambers 10, 11 isolated from the interior space of the gasification furnace 1. The empty chambers 10, 11 are held in communication with the interior space of the gasification furnace 1 only through air supply nozzles 12 mounted in the bottom and side wall sections 8, 9.

A plurality of igniters 13 are mounted on a lower surrounding wall section of the gasification furnace 1 for igniting the waste material A placed in the gasification chamber 1. Each of the igniters 13 comprises an ignition burner or the like, and is connected through a fuel supply pipe 15 to a fuel supply device 14 for supplying a combustion assistant fuel, the fuel supply device 14 being disposed outside of the gasification furnace 1. The igniters 13 burns the combustion assistant fuel supplied from the fuel supply device 14 through the fuel supply pipes 15 to produce flames that are directed into the gasification furnace 1 to ignite the waste material 1 in the gasification furnace 1.

The gasification furnace 1 has a water jacket 16 defined in its surrounding wall for cooling the gasification furnace 1. The water jacket 16 is isolated from the interior space of the gasification furnace 1. A water level sensor 17 for detecting a water level in the water jacket 16 is mounted on the upper wall of the gasification furnace 1.

The water jacket 16 is supplied with cooling water from a water supply device 18. The water supply device 18 comprises a water supply 19 disposed outside of the gasification furnace 1, a water supply pipe 20 interconnecting the water supply 19 and the water jacket 16, a flow control valve 21 disposed in the water supply pipe 20, and a valve controller 22 for opening and closing the flow control valve 21. The valve controller 22 is supplied with a detected water level signal from the water level sensor 17.

The valve controller 22 comprises an actuator 22a such as a motor for selectively opening and closing the flow control valve 21, and a control unit 22b comprising a CPU, etc. for controlling operation of the actuator 22a. The control unit 22b monitors the water level in the water jacket 16 as it is detected by the water level sensor 17, and operates the actuator 22a depending on the detected water level in the water jacket 16.

The flow control valve 21 is opened by the valve controller 22 to supply cooling water from the water supply 19 through the water supply pipe 20 to the water jacket 16. The valve controller 22 opens and closes the flow control valve 21 so that the water level detected by the water level sensor 18 reaches a predetermined level.

A temperature sensor 23 for detecting a temperature T1 in the gasification furnace 1 is mounted on an upper portion of the surrounding wall of the gasification furnace 1.

The combustion furnace 2 is made of a refractory material and substantially cylindrical in shape. The combustion furnace 2 has a gas inlet port 24 defined centrally in one end thereof for introducing a combustible gas and connected through a gas pipe 26 as a gas introduction passage to a gas outlet port 25 defined in the upper portion of the surrounding wall of the gasification furnace 1. The combustible gas produced when the waste material A is thermally decomposed by dry distillation in the gasification furnace 1 is introduced through the gas pipe 26 into the combustion chamber 2. The combustion furnace 2 has a gas ejection port 27 defined centrally in its opposite end for ejecting a burned gas produced when the introduced combustible gas is combusted in the combustion chamber 2. The combustion furnace 2 also has a tapered section 28 that is joined to and progressively tapered toward the gas ejection port 27.

A temperature sensor 29 for detecting a temperature T2 of the combustible gas as it is burned is mounted in the gas ejection port 27.

The combustion furnace 2 has an oxygen inlet port 30 defined in a surrounding wall thereof near the gas inlet port 24 radially outwardly thereof and opening into the combustion furnace 2 for supplying oxygen (air) required to burn the combustible gas into the combustion furnace 2. An igniter 31 for igniting the combustible gas introduced into the combustion furnace 2 is also mounted on the surrounding wall of the combustion furnace 2 near the gas inlet port 24.

Figure 2A:
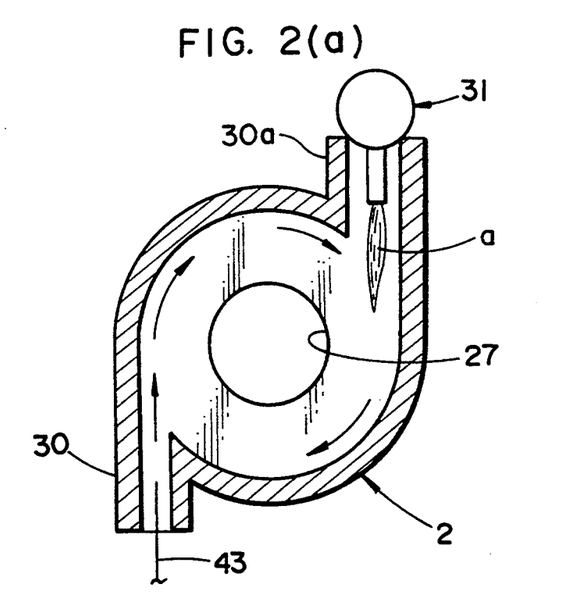
FIG. 2(a) is a cross-sectional view taken along line II—II of FIG. 1.

As shown in FIG. 2(a), the oxygen inlet port 30 is directed tangentially with respect to an inner circumferential wall surface of the combustion furnace 2. Therefore, oxygen (air) supplied from the oxygen inlet port 30 thus directed flows circumferentially along the inner circumferential wall surface of the combustion furnace 2 toward the gas ejection port 27 as indicated by the arrows in FIG. 2(a), causing a swirling flow around the gas inlet port 24. The swirling flow of supplied oxygen directed toward the gas ejection port 27 impinges upon the inner wall of the tapered section 28 and is disturbed thereby, generating a turbulent flow in the tapered section 28.

The igniter 31 comprises an ignition burner or the like, and is connected to the fuel supply device 14 through a fuel supply pipe 32. As shown in FIG. 2(a), the igniter 31 is disposed in an igniting flame ejection port 30a defined in the combustion furnace 2 in diametrically opposite relationship to the oxygen inlet port 30. The igniting flame ejection port 30a is oriented tangentially with respect to the inner circumferential wall surface of the combustion furnace 2 so as to be open along the swirling flow of oxygen that is supplied from the oxygen inlet port 30. The igniter 31 ignites fuel supplied from the fuel supply device 14 through the fuel supply pipe 32, and directs an igniting flame a from the igniting flame ejection port 30a into the combustion furnace 2 for igniting a combustible gas introduced into the combustion chamber 2. Since the igniting flame ejection port 30a is oriented tangentially with respect to the inner circumferential wall surface of the combustion furnace 2, the igniting flame a ejected from the igniting flame ejection port 30a flows along the swirling flow of oxygen supplied from the oxygen inlet port 30 in the circumferential direction of the combustion furnace 2.

The igniter 31 is associated with an igniter controller 31a for controlling igniting operation thereof, the igniter controller 31a being supplied with a detected signal from the temperature sensor 29. The igniter controller 31a monitors the temperature of the combustible gas as detected by the temperature sensor 29, and controls the igniter 31 to ignite the combustible gas depending on the detected temperature of the combustible gas.

A boiler 33, for example, is connected to the gas ejection port 27 of the combustion furnace 2. The boiler 33 uses, as a heat source, the heat of combustion of the combustible gas in the combustion chamber 25.

The oxygen supply device 3 for supplying oxygen to the gasification furnace 1 comprises an oxygen supply 34 disposed outside of the gasification furnace 1, a main oxygen supply pipe 35 extending from the oxygen supply 34, a pair of auxiliary oxygen supply pipes 36, 37 branched from the main oxygen supply pipe 35 and connected respectively to the empty chambers 10, 11 of the gasification chamber 1, a pair of flow control valves 38, 39 disposed respectively in the auxiliary oxygen supply pipes 36, 37, and a pair of valve controllers 40, 41 for controlling the flow control valves 38, 39, respectively. The valve controller 40 is supplied with the detected signal from the temperature sensor 29 and operates the valve 38 to control the amount of oxygen supplied from the oxygen supply 34. The valve controller 41 is supplied with the detected signals from the temperature sensors 29, 23.

The valve controller 40 comprises an actuator 40a such as a motor for opening and closing the flow control valve 38, and a control unit 40b comprising a CPU, etc. for controlling operation of the actuator 40a. The control unit 40b monitors the temperature T2 of the combustible gas as it is detected by the temperature sensor 29 and operates the actuator 40a depending on the detected temperature T2 to control the opening of the flow control valve 38. Similarly, the valve controller 41 comprises an actuator 41a such as a motor for opening and closing the flow control valve 39, and a control unit 41b comprising a CPU, etc. for controlling operation of the actuator 41a. The control unit 41b monitors the temperature T1 in the gasification furnace 1 as it is detected by the temperature sensor 23 and the temperature T2 of the combustible gas as it is detected by the temperature sensor 29, and operates the actuator 41a depending on the detected temperatures T1, T2 to control the opening of the flow control valve 39.

The oxygen supply device 4 for supplying oxygen to the combustion furnace 2 comprises an oxygen supply 42 disposed outside of the combustion chamber 2, a main oxygen supply pipe 43 extending from the oxygen supply 42 and connected to the oxygen inlet port 30 of the combustion furnace 2, a flow control valve 44 disposed in the main oxygen supply pipe 43, a valve controller 45 for controlling the flow control valve 44, a flow rate meter 46 disposed in the main oxygen supply pipe 43 upstream of the flow control valve 44, an auxiliary oxygen supply pipe 47 branched from the main oxygen supply pipe 43 at the junction between the flow rate meter 46 and the flow control valve 44 and connected to the main oxygen supply pipe 43 downstream of the flow control valve 44, and a flow control valve 48 disposed in the auxiliary oxygen supply pipe 47. The valve controller 45 is supplied with the detected signal from the temperature sensor 29.

The valve controller 45 comprises an actuator 45a such as a motor for opening and closing the flow control valve 44, and a control unit 45b comprising a CPU, etc. for controlling operation of the actuator 45a. The control unit 45b monitors the temperature T2 of the combustible gas as it is detected by the temperature sensor 29, and operates the actuator 45a depending on the detected temperature T2.

The flow control valve 48 is manually openable and closable by the operator for adjusting the amount of oxygen supplied from the oxygen supply 42 to the oxygen inlet port 30.

Operation of the incinerating apparatus of the above structure will be described below.

To incinerate a waste material A such as waste tires, the door 5 is opened, and the waste material A is charged into the gasification furnace 1 through the charge inlet 6.

After the door 5 is closed, the igniters 13 are actuated to ignite the waste material A in the gasification furnace 1. The waste material A now starts to be burned partially. When the waste material A starts to be burned partially, the igniters 13 are inactivated.

Before the waste material A is ignited, the water jacket 16 of the gasification furnace 1 has been supplied with cooling water from the water supply 19 through the water supply pipe 20, and the igniter 31 of the combustion furnace 18 has been operated under the control of the igniter controller 31a.

Before the waste material A is ignited, the flow control valve 44 of the oxygen supply device 4 has been opened to a relatively small degree by the valve controller 45. Therefore, oxygen (air) has already been supplied from the oxygen supply 42 through the oxygen supply pipe 43 and the oxygen inlet port 30 into the combustion furnace 2. At this time, the oxygen supplied from the oxygen inlet port 30 into the combustion furnace 2 flows toward the gas ejection port 27 while swirling around the gas inlet port 24.

Figure 3A:
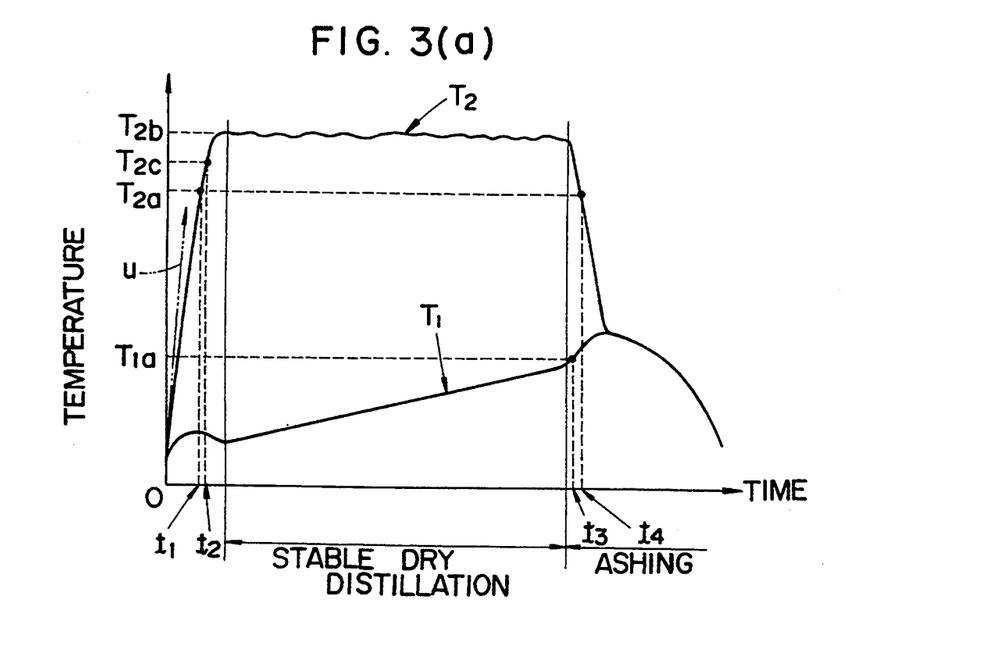
FIG. 3(a) is a graph illustrative of an operation sequence of the apparatus according to the present invention.
Figure 3B:
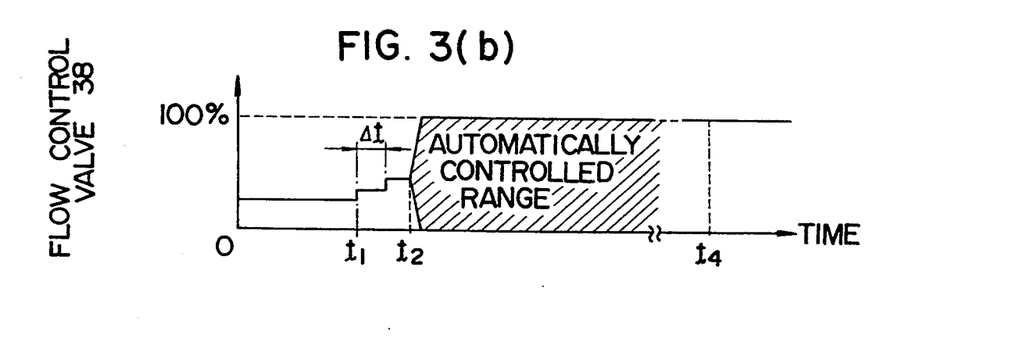
FIG. 3(b) is a graph showing the manner in which a flow control valve of the apparatus operates in the operation sequence shown in FIG. 3(a)
Figure 3C:
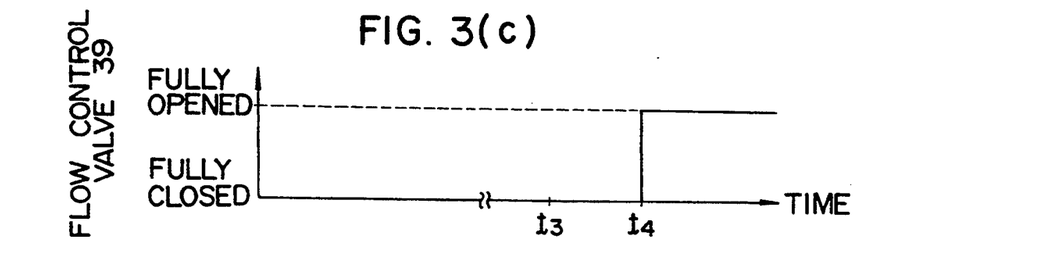
FIG. 3(c) is a graph showing the manner in which another flow control valve of the apparatus operates in the operation sequence shown in FIG. 3(a).

When the waste material A is ignited, the flow control valve 38 of the oxygen supply device 3 has been opened to a relatively small degree, as shown in FIG. 3(b), by the valve controller 40. Therefore, a relatively small amount of oxygen has already been supplied from the oxygen supply 34 through the oxygen supply pipes 35, 36, the empty chamber 10, and the air supply nozzles 12 into the gasification furnace 1. Therefore, the waste material A is ignited by the igniters 13 and then starts being partly burned on any oxygen that has been present in the gasification furnace 1 and the relatively small amount of oxygen that has been supplied from the oxygen supply 34.

At the time the waste material A is ignited, the flow control valve 39 of the oxygen supply device 3 and the flow control valve 48 of the oxygen supply device 4 are closed.

When the lower portion of the waste material A is ignited, it starts being progressively combusted, and the upper portion of the waste material A starts to be thermally decomposed by way of dry distillation due to the heat of combustion. As the dry distillation begins, the waste material A starts producing a combustible gas, which is stored in the upper portion of the gasification furnace 1.

The oxygen supplied into the combustion furnace 2 swirls around the gas inlet port 24 that communicates with the upper portion of the gasification furnace 1 through the gas pipe 26. Therefore, the combustible gas in the gasification furnace 1 is drawn from the gasification furnace 1 through the gas pipe 26 and the gas inlet port 24 into the combustion furnace 2 by the swirling oxygen in the combustion furnace 2. The combustible gas introduced into the combustion furnace 2 is mixed with the oxygen (air) therein, and ignited by the igniting flame produced by the igniter 31. Thus, the combustible gas starts being burned in the combustion furnace 2.

The igniter 31 is positioned relatively closely to the gas inlet port 24 and the oxygen inlet port 30, and the combustible gas introduced into the combustion furnace 2 is quickly mixed with the swirling oxygen therein. Consequently, the combustible gas can quickly be ignited. Inasmuch as the igniting flame a generated by the igniter 31 is ejected through the igniting flame ejection port 30a along the swirling oxygen flow, the igniting flame a is stable for smooth ignition of the combustible gas.

The combustion of the lower portion of the waste material A in the gasification furnace 1 is progressively stabilized while consuming the small amount of oxygen supplied from the oxygen supply 34. The region where the waste material A is burned is progressively spread. As the combustion of the lower portion of the waste material A is progressively stabilized, the dry distillation of the upper portion of the waste material A with the heat of combustion is progressively rendered more active, producing a progressively larger amount of combustible gas. Therefore, the amount of combustible gas introduced into the combustion furnace 2 is increased, and the temperature T2 of the combustion gas as it is burned in the combustion furnace 2 rises, as shown in FIG. 3(a).

At this time, the temperature T2 of the combustion gas is detected by the temperature sensor 29. When the detected temperature T2 of the combustion gas reaches a predetermined temperature T2a at a time t1 in FIG. 3(a), the valve controller 40 of the oxygen supply device 3 increases the opening of the flow control valve 38 stepwise. Since the opening of the flow control valve 38 is thus progressively increased stepwise, the amount of oxygen supplied from the oxygen supply 34 to the gasification furnace 1 is also increased stepwise while being limited to the extent that is required to continue the combustion of the lower portion of the waste material A. The combustion of the lower portion of the waste material A is therefore progressively stabilized without spreading excessively. The dry distillation of the upper portion of the waste material A caused by the combustion of the lower portion thereof also stably progresses.

The temperature T2 of the combustible gas as it is detected by the temperature sensor 29 further increases to a temperature $T2c$ at a time t2 (FIG. 3(a)), which is lower than a preset temperature $T2b$ at which the combustible gas starts spontaneous combustion and nitrogen oxides produced by such combustion are small ($T2a < T2c < T2b$). When the temperature T2 reaches the temperature $T2c$, the valve controller 40 of the oxygen supply device 3 automatically adjusts the opening of the flow control valve 30 to keep the temperature T2 of the combustible gas at the temperature $T2b$.

The automatic adjustment of the opening of the flow control valve 38 is effected as follows:

When the temperature T2 becomes lower than the temperature $T2b$, the opening of the flow control valve 38 is increased to increase the amount of oxygen supplied to the gasification furnace 1. The combustion of the lower portion of the waste material A is promoted, accelerating the dry distillation of the upper portion of the waste material A due to the heat of combustion and the generation of the combustible gas due to the dry distillation.

Conversely, when the temperature T2 becomes higher than the temperature $T2b$, the opening of the flow control valve 38 is reduced to reduce the amount of oxygen supplied to the gasification furnace 1. The combustion of the lower portion of the waste material A is suppressed, retarding the dry distillation of the upper portion of the waste material A due to the heat of combustion and the generation of the combustible gas due to the dry distillation.

Therefore, as shown in FIG. 3(a), the temperature T2 of the combustible gas as it is turned is maintained at the temperature $T2b$, at which the combustion of the lower portion of the waste material A and the dry distillation of the upper portion thereof progress stably.

When the temperature T2 is maintained at the temperature $T2b$ for spontaneous combustion, the igniter 31 of the combustion furnace 2 is inactivated by the igniter controller 31a, and the combustible gas is continuously burned by way of spontaneous combustion. The heat of combustion of the combustible gas is utilized as the heat source of the boiler 33.

The oxygen which is required by the combustion of the combustible gas in the combustion furnace 2 is supplied from the oxygen supply device 4 as follows:

In an initial stage of the dry distillation of the waste material A, as the amount of combustible gas introduced into the combustion furnace 2 is increased, thus increasing the temperature T2 of the combustible gas as it is burned, the valve controller 45 of the oxygen supply device 4 opens the flow control valve 44 to increase the amount of oxygen supplied to the combustion furnace 2. In a stage where the dry distillation of the waste material A stably progresses, as the temperature T2 of the combustible gas slightly fluctuates, i.e., increases and decreases, the opening of the flow control valve 44 is controlled to increase and decrease, adjusting the amount of oxygen introduced into the combustion furnace 2 to an amount required for complete combustion of the combustible gas.

During this time, the oxygen is swirling around the gas inlet port in the combustion furnace 2, and a turbulent flow is being produced in the tapered section 28 of the combustion furnace 2. Therefore, the combustible gas introduced from the gas inlet port 24 into the combustion furnace 2 is quickly absorbed by the swirling oxygen flow in the vicinity of the gas inlet port 24 and uniformly mixed with the oxygen near the tapered section 28.

Therefore, in the stage where the dry distillation of the waste material A stably progresses, the combustible gas generated in the gasification furnace 1 is drawn by the swirling oxygen flow in the combustion furnace 2 and smoothly and stably introduced into the combustion furnace 2. After the combustible gas is introduced into the combustion furnace 2, it is quickly and uniformly mixed with the oxygen necessary to burn the combustible gas, which is burned by spontaneous combustion in the tapered section 28. The mixture of the combustible gas with the oxygen and combustion thereof in the combustion furnace 2 therefore take place within a very short period of time, and the combustion of the combustible gas stably occurs in the tapered section 28.

When the combustion furnace 2 is supplied with oxygen, the operator may manually operate on the flow control valve 48 while confirming the condition in which the combustible gas is being burned in the combustion furnace 2 and the amount of supplied oxygen as it is measured by the flow rate meter 46, thereby regulating the amount of oxygen supplied to the combustion furnace 2.

During the dry distillation of the waste material A, there are developed, in the interior space of the gasification furnace 1, an ashing layer a, a red-hot layer b, a fluidized layer c, a heat transfer layer d, and a gas layer e, arranged successively from the bottom to the top of the gasification furnace 1. Of these layers, the ashing layer a developed upon completion of combustion of the waste material A spreads upwardly as the partial combustion of the waste material A progresses, and the red-hot layer b where the waste material A is burned is progressively shifted upwardly. As the ashing layer a spreads upwardly and the red-hot layer b is progressively shifted upwardly, the fluidized layer c, the heat transfer layer d, and the gas layer e in which the dry distillation of the waste material A progresses are reduced in extent, i.e., the amount of the waste material A that can be thermally decomposed by dry distillation is reduced.

As the amount of the waste material A that can be thermally decomposed by dry distillation is reduced, regardless of the supply of oxygen to the gasification furnace 1 through the flow control valve 38, the waste material A can no longer produce the combustible gas in an amount large enough to keep the temperature T2 at the substantially constant level $T2b$ in the combustion furnace 2. As a result, the amount of combustible gas introduced into the combustion furnace 2 is eventually reduced, and so is the temperature T2 of the combustible gas, as shown in FIG. 3(a).

When the temperature T2 of the combustible gas drops below the temperature $T2b$, the valve controller 40 opens the flow control valve 38 to accelerate the dry distillation of the waste material A. Therefore, when the temperature T2 drops below the temperature T2b, the flow control valve 38 is fully opened as shown in FIG. 3(b).

During the dry distillation of the waste material A in the gasification furnace 1, the temperature T1 in the gasification furnace 1 is detected by the temperature sensor 23. The detected temperature T1 varies as shown in FIG. 3(a). Specifically, as shown in FIG. 3(a), in an initial stage of the dry distillation of the waste material A, the temperature T1 rises as the lower portion of the waste material A starts being burned. Then, the temperature T1 temporarily drops because the heat of combustion is absorbed by the dry distillation of the waste material A. When the dry distillation of the waste material A progresses stably, the temperature T1 increases again as the combustion of the lower portion of the waste material A progresses. As the temperature T2 decreases, the red-hot layer b in the portion of the waste material A except the ashing layer a is increased, and the heat of combustion that is absorbed by the dry distillation of the waste material A is reduced. As shown in FIG. 3(a), the temperature T1 in the gasification furnace 1 sharply rises and then drops as the combustion and ashing of the waste material A progresses. In the stage in which the waste material A is finally ashed, it is necessary to completely combust and ash the waste material A.

According to this embodiment, therefore, at the time the temperature T2 of the combustible gas decreases after being maintained substantially at the temperature T2b, when the temperature T2 as it is detected by the temperature sensor 29 drops below the temperature T2a or lower at a time t4, and also the temperature T1 in the gasification furnace 1 as it is detected by the temperature sensor 23 rises at a time t3 (FIG. 3(a)) beyond a predetermined temperature T1a that is preset as indicating the final stage of the dry distillation of the waste material A, the valve controller 41 opens the flow control valve 39, supplying oxygen from the oxygen supply 34 through the oxygen supply pipes 35, 36, the empty chamber 11, and the air supply nozzles 12 into the gasification furnace 1.

Therefore, the gasification furnace 1 is supplied with an increased amount of oxygen from the oxygen supply 34 through both the oxygen supply pipes 36, 37. The final combustion of the waste material A is thus accelerated to fully ash the waste material A in its entirety.

When the temperature T2 of the combustion gas drops, the combustible gas becomes incapable of spontaneous combustion. Upon a reduction in the temperature T2, therefore, the igniter 31 is operated by the igniter controller 31a to burn the combustible gas.

The gasification furnace 1 has an ash outlet (not shown) in the lower portion thereof for discharging the finally produced ash out of the gasification furnace 1.

In the incinerating apparatus according to the above embodiment, the waste material A can be burned, thermally decomposed by dry distillation, and ashed smoothly and reliably, and the combustible gas produced by the dry distillation of the waste material can also be burned smoothly and reliably without giving rise to nitrogen oxides that would cause environmental pollution. Accordingly, the waste material A can be incinerated cleanly.

In the combustion of the combustible gas in the combustion chamber 2, the supplied oxygen is swirled around the gas inlet port 24, and a turbulent flow is developed in the tapered section 28 of the combustion furnace 2, for thereby smoothly introducing the combustible gas from the gasification furnace 1 smoothly into the combustion furnace 2 without a suction fan or the like and also for thereby allowing the introduced combustible gas to be quickly uniformly mixed with the supplied oxygen and burned. The combustion capability of the combustion furnace is thus much higher than that of the conventional combustion furnace.

An experiment conducted by the inventor indicates that whereas the conventional combustion furnace had a combustion capability of several hundred thousand $kcal/m^3.h$, the combustion furnace 2 according to the present invention had a combustion capability of several million $kcal/m^3.h$.

The supplied oxygen is swirled simply by introducing it from the oxygen inlet port 30 that is defined tangentially with respect to the circumferential wall of the combustion furnace 2. Therefore, the structure for producing an swirling oxygen flow is quite simple.

Figure 2B:
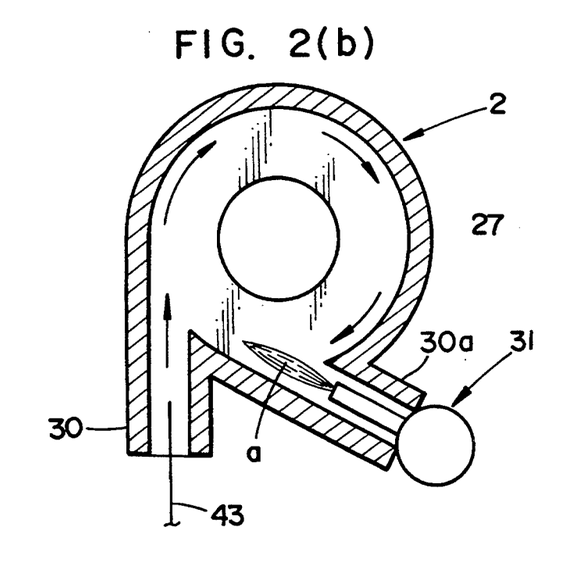
FIG. 2(b) is a cross-sectional view similar to FIG. 2(a), showing a modification.

Instead of relatively positioning the oxygen inlet port 30 and the igniter 31 on the combustion furnace 2 as shown in FIG. 2(a), the igniter 31 may be mounted on the combustion furnace 2 so as to be directed toward the oxygen inlet port 30 as shown in FIG. 2(b).

With the modification shown in FIG. 2(b), while the temperature of the combustible gas introduced into the combustion furnace 2 is relatively low, the oxygen supplied to the combustion furnace 2 is heated in the oxygen inlet port 30 by the igniting flame a produced by the igniter 31 and then mixed with the combustible gas. Consequently, the combustible gas can smoothly be ignited for combustion by the igniter 31 in the initial or final stage of the dry distillation.

Although a certain preferred embodiment of the present invention has been shown and described in detail, it should be understood that various changes and modifications may be made therein without departing from the scope of the appended claims.

What is claimed is:

1. An apparatus for incinerating a waste material by processing the waste material through dry distillation and gasification, comprising:

a gasification furnace for storing a waste material therein and burning a portion of the waste material and thermally decomposing a remainder of the waste material by way of dry distillation with a heat of combustion of the portion of the waste material, thereby producing a combustible gas;

a cylindrically shaped gas combustion furnace having a circular cross section with a predetermined internal diameter for combusting said combustible gas produced in said gasification furnace, said combustion furnace being connected to said gasification furnace through a gas introduction passage, the combustible gas being introduced into said gas combustion furnace from said gasification furnace through the gas introduction passage, said gas combustion furnace having a substantially cylindrical gas inlet port connected to said gas introduction passage, said gas inlet port having an internal diameter less than said predetermined internal diameter, said gas inlet port being disposed at one end of said gas combustion furnace such that an axis of said gas inlet port is disposed co-axially with an axis of said gas combustion furnaces, said gas inlet port opening into said gas combustion furnace such that said combustible gas enters said gas combustion furnace through said gas inlet port; and oxygen supply means for supplying said gas combustion furnace with an amount of oxygen required to combust the combustible gas in said gas combustion furnace, said amount of oxygen mixing with said combustible gas for promoting combustion thereof, said oxygen supply means comprising an oxygen inlet port having an interior wall surface disposed tangentially to an inner circumferential wall surface of said gas combustion furnace, and wherein said oxygen supply port is disposed proximate said gas inlet port for generating a vortical oxygen flow that rotates around the axis of said gas inlet port so that the axis of said gas inlet port is disposed substantially at a center of said vortical oxygen flow.

2. An apparatus according to claim 1, wherein said gas combustion furnace has a gas ejection port defined in an opposite end thereof for ejecting a gas produced when the gas combustible gas is combusted in said combustion furnace, said gas combustion furnace having a tapered section joined to and tapered toward said gas ejection port.

3. An apparatus according to claim 1, further comprising igniting means positioned near said gas inlet port for igniting the combustible gas that is introduced from said gas inlet port into said gas combustion furnace.

4. An apparatus according to claim 3, wherein said igniting means comprises means for generating an igniting flame, said igniting means being disposed such that said igniting flame is directed tangentially to said gas combustion furnace and along said vortical oxygen flow produced around said gas inlet port.

5. An apparatus according to claim 3, wherein said igniting means comprising means for generating an igniting flame, said igniting means being disposed in said oxygen inlet port such that said igniting flame is directed tangentially into said gas combustion furnace, and toward said oxygen inlet port.

6. An apparatus according to claim 1, wherein said gas combustion furnace has an igniting flame ejection port circumferentially spaced from said oxygen inlet port and directed tangentially with respect to the gas combustion furnace, further comprising igniting means disposed in said igniting flame ejection port for ejecting an igniting flame through said igniting flame ejection port into said gas combustion furnace to ignite the combustible gas that is introduced into said gas combustion furnace.

* * * * *